United States Patent [19]

Holzl et al.

[11] Patent Number: 5,260,096

[45] Date of Patent: Nov. 9, 1993

[54] STRUCTRAL ARTICLES

[75] Inventors: Robert A. Holzl, Flintridge; Yvonne R. DeKay, Los Angeles, both of Calif.; Richard E. Tressler, Boalsburg, Pa.; Vincent L. Magnotta, Coopersburg, Pa.; Paul N. Dyer, Allentown, Pa.

[73] Assignee: Air Products and Chemicals, Inc., Allentown, Pa.

[21] Appl. No.: 62,292

[22] Filed: Jun. 11, 1987

[51] Int. Cl.$^5$ .............................. B05D 7/00
[52] U.S. Cl. ................... 427/215; 427/219; 427/249; 427/255; 427/299; 427/419.2
[58] Field of Search ............. 427/215, 219, 299, 314, 427/255, 419.2, 249

[56] References Cited

U.S. PATENT DOCUMENTS

| | | | |
|---|---|---|---|
| 3,193,399 | 7/1965 | Washburn et al. | 106/44 |
| 3,874,919 | 4/1975 | Lehman | 117/212 |
| 3,924,024 | 12/1975 | Naber et al. | 427/419.2 |
| 4,090,851 | 5/1978 | Berkman et al. | 23/273 |
| 4,356,152 | 10/1982 | Berkman et al. | 422/248 |
| 4,476,234 | 10/1984 | Jones et al. | 501/89 |
| 4,560,589 | 12/1985 | Endou et al. | 427/255.1 |
| 4,746,480 | 5/1988 | Clark | 427/255 |

OTHER PUBLICATIONS

Oakridge Nat'l Laboratories, ORNC/TM-9673. p. 104, publn. Sep. 1985 Ceramic Technology For Heat Engines Project Semiannual Progress Report-Oct. 1984-- Mar. 1985.

Am. Ceram. Soc. Bull. 65 (8) 1171-76 (1986) "Surface Characterization of Silicon Nitride & Silicon Carbide Powders".

"Parameter and Reactor Dependence of Selective Oxide RIE in $CF_4+H_2$"-L. M. Ephrath & E. J. Petrillo (Plasma Processing), p. 217.

"Phosphorus Pentaflourine and Sulfurylflorine Applied to Etch $SiO_2$ In Search for Higher Selectives" K. M. Eisele, p. 146.

"The Preparation & C-V Characteristics of $Si+Si_3N_3$ & $Si-SiO_2-Si_3N_4$ Structures", T. L. Chu, J. R. Tzedom and C. H. Lee, pp. 897-905.

Engineering Property Data on Selected Ceramics vol. 1, Nitrides, Mar. 1976, Battelle, Columbus, Ohio, p. 5.3.3.-31.

Primary Examiner—Donald P. Walsh
Assistant Examiner—Chrisman D. Carroll
Attorney, Agent, or Firm—Keith D. Gourley; James C. Simmons; William F. Marsh

[57] ABSTRACT

A structural article for high temperature applications comprises a body formed of at least partially consolidated, particulate silicon nitride, a conformal outer coating of silicon nitride or silicon carbide on the body, and a conformal intermediate layer of a silicon, oxygen and nitrogen-containing compound, i.e. silicon oxynitride, chemically bonded to both the body and the outer coating. The method for making such an article comprises providing a body formed of at least partially consolidated, particulate silicon nitride, oxidizing the surface of the body, removing silicon dioxide from the oxidized surface of the body; and chemically vapor depositing a conformal outer coating of silicon nitride or silicon carbide. The conformal outer coating provides a protective envelope around and assists in high temperature isostatic pressing of the body and hence permits one to use the structural article in isostatic pressing processes.

19 Claims, 2 Drawing Sheets

STRUCTRAL ARTICLES

TECHNICAL FIELD

This invention relates to improvements in structural articles for high temperature applications. More particularly, the invention relates to a silicon nitride body having a conformal outer coating of silicon nitride or silicon carbide.

BACKGROUND OF THE INVENTION

Considerable effort has been made in recent years to produce various types of ceramic structures for use in high temperature applications such as gas turbine engines, rocket nozzles, and turbo chargers. The relative light weight of ceramic structures as compared to metal alloy structures provides significant improvement in many cases. Such improvement is particularly notable in the case of moving parts, since the inertia of the structure is substantially less when comprised of ceramic materials. Also, such materials typically have a high modulus of elasticity and a low thermal coefficient of expansion, which are desirable characteristics in high temperature dynamic applications.

One of the ceramic materials which has been investigated for high temperature structural applications is silicon nitride. Typically, silicon nitride bodies requiring close dimensional tolerance are fabricated from silicon nitride powder. However, in the manufacture of silicon nitride bodies the use of bonding agents, sintering aids, or reaction sintering techniques has typically been necessary. An example of the use of such techniques is disclosed in Washburn, U.S. Pat. No. 3,193,399, in which granular silicon carbide is mixed with finely divided silicon and a finely divided cyanamide compound and the mixture is fired in an oxidizing atmosphere. The material resulting from this technique comprises silicon carbide bonded with silicon nitride and what is probably silicon oxynitride. The ability to manufacture parts very close to the desired final shape at low cost using these techniques is a significant advantage.

A disadvantage of bonded and sintered silicon nitride is that it is subject to oxidation attack. This can cause deterioration of the surface of a silicon nitride body, particularly at high temperatures. Moreover, room temperature strength may be lower than desired. For this reason, attempts have been made to provide outer oxidation resistant coatings on bodies of particulate silicon nitride and silicon carbide are good high temperature oxidation resistant materials which would make desirable outer coatings. For example, silicon nitride has been used to coat materials other than silicon nitride; see, for example. U.S. Pat. Nos. 4,090,851 and 4,356,152. Similarly, silicon carbide has been used to coat materials other than silicon nitride; see, for example, the report of Oak Ridge National Laboratories, ORNL/TM-9673, page 104, publication date September, 1985 entitled "Ceramic Technology for Heat Engines Project Semiannual Progress Report for Period October 1984-March 1985". However, useful silicon nitride coatings on particulate silicon nitride bodies have not, prior to this invention, been successfully achieved by conventional vapor deposition techniques. Similar problems exist with silicon carbide coatings on particulate silicon nitride bodies. In both instances, adhesion is very poor resulting in a spalling or flaking off of the coating under minimal stress conditions.

In addition to providing oxidation resistance, dimensionally additive coatings are provided on partially consolidated, particulate ceramic bodies, such as by chemical or physical vapor deposition, to provide an envelope around and to assist in high temperature isostatic pressing of the body. This pressing initially densifies the body and improves its mechanical properties. Without an encapsulating coating, the high pressure gas used in isostatic pressing infiltrates the porous body and may cause disintegration of the body during the pressing process. Coatings of various materials have been employed to encapsulate partially consolidated, particulate silicon nitride bodies to permit hot isostatic pressing. Unfortunately, if the coating is not useful in the final product (e.g. is not resistant to oxidation at high temperature), it may have to be removed from the body after the isostatic pressing process. If it were possible to coat partially consolidated, particulate silicon nitride bodies with silicon carbide or silicon nitride, such a coating would not only facilitate hot isostatic pressing of the body, but the coating could be left in place after isostatic pressing to form a high temperature oxidation resistant surface for the body.

As previously mentioned, attempts in the prior art to coat particulate silicon nitride bodies with either silicon nitride or silicon carbide using chemical vapor deposition (CVD) or physical vapor deposition (PVD) have been unsuccessful. This is because inadequate adherence of the deposited coating to the surface of the sintered or reaction boded silicon nitride substrate has not been achieved.

In the report of Oak Ridge National Laboratories, supra, at pages 104-105, a proposed method is described for improving the adhesion of physical vapor deposited, sputtered, or plasma sprayed coatings of zirconium oxide materials to the surface of reaction bonded or sintered silicon nitride. This method involves the etching of the as-received and oxidized surfaces of the substrate with aqueous hydrogen fluoride (HF) before applying the outer coating. According to the authors of this report: "The change in surface roughness observed suggests that HF etching should not significantly improve coating adherence through mechanical interlocking of the coating with substrate surface features."

SUMMARY OF THE INVENTION

In contrast to the methods of the prior art, the method of the present invention allows one to deposit a strongly adherent conformal coating of silicon nitride or silicon carbide on a silicon nitride body. It is believed that this effect is achieved by removing the oxides, principally silicon oxides, during the method of the present invention and forming an intermediate coating of silicon oxynitride.

Very generally, in practicing the method of the present invention, a body formed of particulate silicon nitride is provided with a conformal intermediate coating comprising a silicon, oxygen and nitrogen-containing compound believed to be, inter alia, silicon oxynitride, bonded to the body. A conformal outer coating of silicon nitride or silicon carbide is then chemically bonded to the intermediate layer. The resultant product is a structural article suitable for high temperature applications comprised of at least partially consolidated, particulate silicon nitride covered with a conformal outer coating of silicon nitride or silicon carbide which is bonded to the body by a conformal intermediate layer comprising silicon oxynitride.

Silicon nitride bodies made from particulate silicon nitride are typically formed in a so-called reaction bonding process or by hot pressing. Reaction bonded silicon nitride is a desirable candidate for applications requiring light weight, low modulus of elasticity and coefficient of thermal expansion, good shock resistance, and a capability of maintaining structural integrity at high operating temperatures.

The desirability of putting a coating of silicon nitride or silicon carbide on silicon nitride bodies has been suggested but has not been effectively accomplished before the present invention. The advantage in this concept is to improve the erosion resistance of the silicon nitride body. In addition, an outer coating of silicon nitride or silicon carbide can be used essentially to encapsulate the part to enable isostatic high temperature pressing to further densify the part and improve its mechanical properties. In high temperature isostatic pressing, the part is put in a high temperature furnace which is then subjected to a high fluid pressure. Therefore, a second advantage of this concept of applying an outer coat of silicon carbide or silicon nitride on a silicon nitride body is to achieve isostatic high temperature pressing while at the same time to improve the erosion and wear resistance and possibly to reduce the surface contamination levels of the coated body during operating conditions.

BRIEF DESCRIPTION OF THE DRAWINGS

The present invention will be more readily understood when read in conjunction with the accompanying drawings in which.

DETAILED DESCRIPTION OF THE INVENTION

Figure 1:
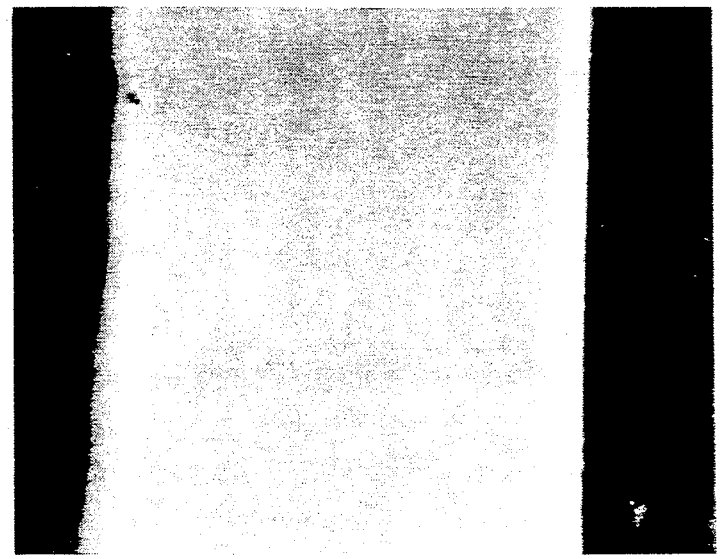
FIG. 1 is a photomicrograph at about 10 times magnification of an exterior surface of a CVD silicon nitride coated silicon nitride test bar produced in accordance with the method of the present invention; see Example I hereinbelow.

In accordance with the present invention, the surface of the partially consolidated, particulate silicon nitride body is first oxidized to form a layer comprising silicon oxynitride bonded to the body. A preferred oxidizing environment is to heat the silicon nitride body to a temperature in the range of about 1000° to about 1500° C. in air or other oxidizing atmosphere. Any suitable combination of pressure, oxygen content of oxidizing atmosphere, and time, within this temperature range, may be employed depending upon the thickness of the intermediate layer desired.

Without being bound by any particular theory, it is believed that as a result of the foregoing oxidation step, a dual layer is formed on the surface of the silicon nitride body comprised of silicon oxynitride adjacent the silicon nitride body and a layer of silicon dioxide on the outer surface of the silicon oxynitride layer. (The silicon dioxide is formed by further oxidation of the silicon oxynitride, during the oxidation step, and even occurs to some extent in air at room temperature.) Silicon oxynitride ($Si_2ON_2$) has thermal properties very close to that of silicon nitride. Thus, the silicon oxynitride layer in effect migrates into the silicon nitride body and the silicon dioxide layer builds up behind it. The oxidation step is continued until the silicon nitride body becomes uniformly covered with the silicon oxynitride layer. As a natural consequence of the oxidation step, the silicon oxynitride layer becomes uniformly covered with a silicon dioxide layer.

Under the foregoing conditions, typical thicknesses of the silicon oxynitride layer are in the range of about 1 to about 100 microns, preferably in the range of about 5 and about 50 microns.

After the above oxidation step, the substrate is etched. Again according to the above theoretical explanation, it is believed that by means of the etch, the layer of silicon oxynitride is exposed by removing the layer of silicon dioxide on the outer surface of the silicon nitride body. The etch used to remove the silicon dioxide layer may be any suitable process of which several are known in the semiconductor processing industry. One method of etch is to apply an aqueous solution of hydrofluoric (HF) acid, i.e., ten parts concentrated HF to one part distilled water, to the body for a duration of thirty seconds. After etching, the surface is rinsed in water and further rinsed in anhydrous alcohol in an ultrasonic cleaner for about fifteen minutes. This and similar types of etches are known collectively as chemical etches.

Although a chemical etch is satisfactory for many applications, it is preferred that the silicon dioxide be removed by gas phase etching. For example, the coated substrate may be heated in a suitable reducing environment such as hydrogen which reduces the $SiO_2$ to gaseous SiO and thereby removes the SiO by volatilization; see Am. Ceram. Soc. Bulletin, 65, pages 1171-76 (1986) entitled "Surface Characterization of Silicon Nitride and Silicon Carbide Powders", by M. N. Rahaman, Y. Boiteux, and L. C. De Jonghe. The silicon nitride or silicon carbide is then deposited by CVD sequentially on the substrate in the same reactor. The advantage of conducting the gas phase etch in situ in this manner is to prevent the formation of so-called native oxide on the freshly etched surface. Native oxide formation occurs readily in the presence of oxygen.

As an alternative to the foregoing methods of removing silicon dioxide, plasma etching using fluorinated compounds as practiced in the semiconductor industry may be used; see Proceedings of the Third Symposium on Plasma Processing, page 217 (1982) entitled "Parameter and Reactor Dependence of Selective Oxide RIE in $CF_4+H_2$", by L. M. Ephrath and E. J. Petrilio and page 146 entitled "Phosphorus Pentafluoride and Sulfuryfluoride Applied to Etch $SiO_2$ in "Search for Higher Selectivities" by K. M. Eisele.

As an alternative to the oxidation step, the silicon oxynitride layer can be directly deposited by CVD under suitable conditions. Following this, an etch is typically necessary due to the propensity for silicon oxynitride to oxidize to silicon dioxide. In addition, it is believed that the etch may create mechanical interstices to further enhance the chemical bonding which takes place between the silicon oxynitride interlayer and the final silicon nitride or silicon carbide coating.

Following the etching step, a coating of silicon nitride or silicon carbide is deposited on the intermediate layer. The silicon nitride or silicon carbide coating is deposited by suitable CVD techniques to thereby form an outer layer. The outer layer is deposited at thicknesses in the range of between about 1 and about 500 microns. Preferably the thickness of the outer layer is about 5 and 100 microns.

The foregoing described process may be carried out in any suitable reactor. However, a preferred form of reactor for carrying out the method of the invention is a typical CVD reactor well known to those skilled in the art. Such a reactor includes a quartz chamber, means within the chamber for supporting the body to be coated, means for introducing the desired combination of gases at the desired flow rates to the chamber, and a suitable heater surrounding the quartz chamber for maintaining the temperature of the body at the desired level.

The following examples are provided to illustrate successful reduction to practice of the invention, but are not intended to limit the scope of the appended claims.

EXAMPLE I

Silicon nitride bars which were surface polished were subjected to oxidation at a temperature of 1365° C. for five minutes at an air flow of 1.4 liters per minute. This produced an oxynitride and oxide layer on the surface estimated to be about 10 microns thick. After cooling of the substrate, the outer surface was etched with ten parts concentrated hydrofluoric acid to one part distilled water for thirty seconds, followed by rinsing and cleaning in anhydrous alcohol in an ultrasonic cleaner for fifteen minutes. Subsequent to etching, silicon nitride was deposited by CVD with a part temperature of 1150° C. for sixty minutes. Flow rates were: $N_2$-1000 cc per minute, $NH_3$-924 cc per minute, and $SiCl_4$-924 cc per minute. Under these conditions, a coating of about 100 microns thick was deposited. Apparent adhesion of the outer coating was achieved on most parts. A further CVD run under identical conditions resulted in achieving one hundred percent adhesion in all cases. FIG. 1 is a photomicrograph of one of the silicon nitride test bars treated in accordance with this Example of the present invention and demonstrates the adhesion between the silicon nitride coating and the silicon nitride substrate.

CONTROL I

Figure 2:
FIG. 2 is a photomicrograph at about 10 times magnification of an exterior surface of a CVD silicon nitride coated silicon nitride test bar produced in accordance with the method of the prior art; see Control I hereinbelow.

As a control, silicon nitride bars were surface polished and placed in a CVD reactor. Silicon nitride was deposited by chemical vapor deposition with a part temperature of 1150° C. for sixty minutes. Flow rates were identical to those specified in Example I. Adhesion in one set of samples was essentially zero to poor. It was evident that the unpretreated (that is, not oxidized and etched according to the invention) substrates were not satisfactorily bonded to the deposits. FIG. 2 is a photomicrograph of one of the silicon nitride test bars treated in accordance with this CONTROL and clearly demonstrates the lack of adhesion between the silicon nitride coating and the silicon nitride substrate.

Adhesion of samples in EXAMPLE I and CONTROL I was determined using a scratch test. In a scratch test, a diamond stylus is dragged across the surface of a sample at a constantly increasing load. Failure of the coating is determined by the acoustic emission that accompanies the failure process as measured with an acoustic detector attached to the diamond stylus. The applied load that corresponds to the onset of failure is the adhesion of the coating (in Newtons). Since there are no standards available for comparison, the number obtained by the scratch test are not useful as absolute measurements. Nevertheless, the number gives a useful comparison between two or more coatings tested by the same procedure and it accepted as one of the best available means for assessing the relative adhesion of ceramic coatings.

Using the scratch test, samples from the procedures of EXAMPLE I and CONTROL I were compared. In the CONTROL I samples, adhesion values varied from about zero to about 3 Newtons with a possible error of plus or minus 1.17 Newtons. Scratch test measurements on EXAMPLE I samples varied from a low of 4.0 Newtons with an error of plus or minus 0.7 Newtons to a high of 10 Newtons with an error of plus or minus 1 Newton. Average adhesion values of the EXAMPLE I samples exceeded seven.

EXAMPLE II

Figure 3:
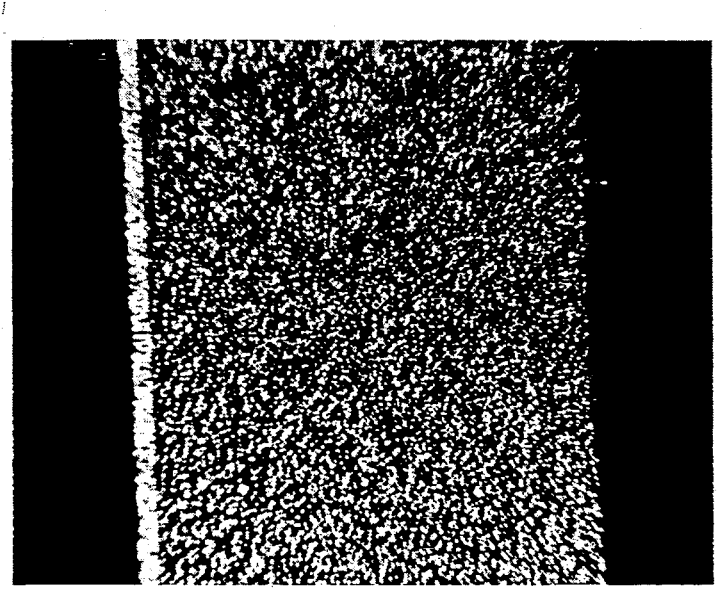
FIG. 3 is a photomicrograph at about 10 times magnification of an exterior surface of a CVD silicon carbide coated silicon nitride test bar produced in accordance with the method of the present invention; see Example II hereinbelow.

The substrate and surface preparation, including oxidation and etching, were identical with those specified in EXAMPLE 1. An outer coating of silicon carbide was then deposited by CVD at a substrate temperature of 1175° C. for forty five minutes, a hydrogen flow of 5600 cc per minute, a nitrogen flow of 5600 cc per minute, and a methyltriclorosilane flow of 155 cc per minute. The resultant coating was about 80 microns thick. The results were substantially identical to those obtained in connection with EXAMPLE I. FIG. 3 is a photomicrograph of one of the silicon nitride test bars treated in accordance with this Example of the present invention and demonstrates the adhesion between the silicon carbide coating and the silicon nitride substrate.

CONTROL II

Figure 4:
FIG. 4 is a photomicrograph at about 10 times magnification of an exterior surface of a CVD silicon carbide coated silicon nitride test bar produced in accordance with the method of the prior art; see Control II hereinbelow.

As a control, silicon nitride bars were surface polished and placed in a CVD reactor. Silicon carbide was deposited by chemical vapor deposition with a part temperature of 1175° C. for forty five minutes. Flow rates were identical to those specified in Example II. It was also evident in this Control that the unpretreated (that is, not oxidized and etched according to the invention) substrates were not satisfactorily bonded to the deposits. FIG. 4 is a photomicrograph of one of the silicon nitride test bars treated in accordance with this CONTROL and clearly demonstrates the poor adhesion between the silicon carbide coating and the silicon nitride substrate.

EXAMPLE III

Surface polished silicon nitride bars may be treated using an RF plasma etch in place of the HF etch as in EXAMPLE I. In such a case, the bars may be surface oxidized at 1345° C. using air flow of 1400 standard cubic centimeters (sccm) for five minutes, producing an oxide layer as in EXAMPLE I. Oxidation is followed by reactive ion etching at greater than 25° C. to less than 100° C. and 25 m Torr using a flow rate of 2400 sccm $CF_4$ and 1600 sccm of hydrogen. Parameters used may be varied as set out by Eprath and Petrill, supra. After etching and purging with dry argon, the silicon nitride deposit is produced by CVD as in EXAMPLE I.

EXAMPLE IV

The procedure set out in EXAMPLE III may be followed, using $CHF_3$ or $C_2F_6$ as the etchant.

EXAMPLE V

The procedure set out in EXAMPLE III may be followed except that the etching step is carried out by heating the bars to a temperature of 1300°–1500° C. in a flow of about 1 liter per minute of hydrogen. After a period of 10 minutes, the outer layer of silicon dioxide is removed by reduction and volatilization to gaseous silicon oxide. This leaves the silicon oxynitride layer exposed. Deposition of silicon carbide or silicon nitride by CVD then follows; the CVD should be conducted immediately after the gaseous etch to avoid film formation prior to the deposition.

EXAMPLE VI

Surface polished silicon nitride bars positioned in a standard CVD reactor are coated with a deposit of silicon oxynitride using a substrate temperature of 1150° C. and flows of gaseous $SiCl_4$ at about 924 cc per minute and gaseous $NH_3$ at about 925 cc per minute. An oxidizing gas such as $O_2$, $CO_2$, and CO is added at a flow rate of at least about 3–10 cc per minute, after about 60 minutes, a silicon oxynitride coating of a approximately 50–100 microns thick is produced chemically which is bonded to the silicon nitride substrate. At that point, an etch of hydrogen at a substrate temperature of about 1330°–1500° C. and flow rate of about 100 cc per minute may be conducted for at least 10 minutes. This is followed by a CVD coating of silicon nitride or silicon carbide as described above.

It may be seen, therefore, that the invention provides an improved method and an improved article wherein a conformal outer coating of silicon nitride or silicon carbide is produced on a body of particulate silicon nitride. Various modifications of the invention in addition to those shown and described herein will become apparent to those skilled in the art from the foregoing description and accompanying claims. Such modifications are intended to fall within the scope of the appended claims.

What is claimed is:

1. A method for making a structural article for high temperature applications, said method comprising, providing a body formed of at least partially consolidated, particulate silicon nitride, forming a conformal intermediate layer comprising a silicon, oxygen and nitrogen-containing compound bonded to said body, and forming a conformal outer coating of silicon nitride or silicon carbide chemically bonded to said intermediate layer.

2. A method according to claim 1 wherein the intermediate layer is formed by a step of oxidizing the surface of the body.

3. A method according to claim 2 wherein the oxidized surface of said body is etched prior to the step of forming the conformal outer coating.

4. A method according to claim 3 wherein the etch is a chemical etch.

5. A method according to claim 4 wherein the chemical etch is an aqueous hydrofluoric acid solution.

6. A method according to claim 2 wherein the oxidizing step comprises heating said body at atmospheric pressure in air.

7. A method according to claim 5 wherein said body is heated to a temperature in excess of 1000° C. during the oxidizing step for a period in excess of one minute.

8. A method according to claim 1 wherein the silicon, oxygen and nitrogen-containing compound is silicon oxynitride.

9. A method according to claim 1 wherein the coating of silicon nitride or silicon carbide is formed by chemical vapor deposition.

10. A method according to claim 1 wherein the intermediate layer is formed by chemical vapor deposition.

11. A method for making a structural article for high temperature applications, which comprises the steps of:
   (a) providing a body formed of at least partially consolidated, particulate silicon nitride;
   (b) oxidizing the surface of said body;
   (c) removing silicon dioxide from the oxidized surface of said body; and
   (d) chemically vapor depositing a conformal outer coating of silicon nitride or silicon carbide.

12. A method according to claim 11 wherein a chemical etch is used during the silicon dioxide removing step.

13. A method according to claim 12 wherein the chemical etch is an aqueous hydrofluoric acid solution.

14. A method according to claim 12 wherein the chemical etch is gaseous hydrogen.

15. A method according to claim 11 wherein a plasma etch is used during the silicon dioxide removing step.

16. A method according to claim 13 wherein the oxidizing step comprises heating said body in air.

17. A method according to claim 16 wherein said body is heated to a temperature in the range of about 1000° C. to about 1500° C. for at least one minute.

18. A method according to claim 17 wherein the oxidized surface of said body is etched to remove silicon dioxide and to expose silicon oxynitride prior to the step of depositing silicon nitride.

19. A method according to claim 11 wherein the silicon dioxide removing step is conducted in situ using a gaseous chemical etch or a plasma etch followed by the conformal outer coating of silicon carbide step to prevent the formation of oxide on freshly oxidized surface.

* * * * *

UNITED STATES PATENT AND TRADEMARK OFFICE
CERTIFICATE OF CORRECTION

PATENT NO. : 5,260,096

DATED : November 9, 1993

INVENTOR(S) : Holzl, et al.

It is certified that error appears in the above-identified patent and that said Letters Patent is hereby corrected as shown below:

On the title page, item [54] and column 1, line 2, change "STRUCTRAL" to --STRUCTURAL--.

Signed and Sealed this

Nineteenth Day of April, 1994

Attest:

BRUCE LEHMAN

Attesting Officer

Commissioner of Patents and Trademarks